Jan. 6, 1959  D. R. FISHER, JR., ET AL  2,867,711
COUNTERTOP COOKING APPARATUS
Filed April 17, 1957  5 Sheets-Sheet 1

INVENTORS.
Daniel R. Fisher, Jr.
BY Marion R. Karechi,
Brown, Jackson,
Boettcher & Diemer,
Att'ys.

Jan. 6, 1959   D. R. FISHER, JR., ET AL   2,867,711
COUNTERTOP COOKING APPARATUS
Filed April 17, 1957   5 Sheets-Sheet 2

INVENTORS.
Daniel R. Fisher, Jr.
BY Marion R. Karecki,
Brown, Jackson, Boettcher & Dienner
Attys.

Jan. 6, 1959

D. R. FISHER, JR., ET AL 2,867,711

COUNTERTOP COOKING APPARATUS

Filed April 17, 1957

INVENTORS.
Daniel R. Fisher Jr.
BY Marion R. Karecki.
Brown, Jackson, Boettcher & Dienner.
Atty's.

United States Patent Office 2,867,711
Patented Jan. 6, 1959

2,867,711

COUNTERTOP COOKING APPARATUS

Daniel R. Fisher, Jr., Benton Harbor, and Marion R. Karecki, St. Joseph, Mich., assignors to Whirlpool Corporation, a corporation of Delaware Application April 17, 1957, Serial No. 653,386

15 Claims. (Cl. 219—37)

This invention relates to cooking apparatus, and has to do with kitchen counters and associated cooking appliances.

In the modern kitchen the trend is toward kitchen counters providing a countertop or work surface and readily accessible cooking appliances associated with the countertop. It is desirable, from the standpoint of appearance, that the appliances conform so far as practicable to the countertop when positioned for use and it is even more desirable that the appliances, when not in use, be concealed from view and that the countertop be not objectionably interrupted or interfered with by the appliances not in use, thus providing additional available working space on the countertop. Our invention is directed to the countertop and associated cooking appliances such that when the appliances are not in use they may be disposed so as to be concealed within the counter and, when so disposed, provide available working areas of the countertop corresponding to the areas of such appliances. More specifically, in the apparatus of our invention the appliances are so mounted that they may be exposed for use with expedition and facility and, when not in use, are so positioned that associated means substantially close the openings in the countertop corresponding to the appliances and provide surfaces approximately flush with the upper surface of the countertop and constituting continuations thereof. A further and important object of our invention is to provide means whereby movement of an appliance to concealed position within the counter while at a temperature such as might cause buckling of or injury to the associated member exposed when the appliance is in concealed position is guarded against. Further objects and advantages of our invention will appear from the detail description.

Referring to Figures 1 to 4, inclusive, the counter 15 may be constructed of any suitable material, frequently plywood, and includes a front wall 16 and a top 17, the latter being provided with a covering 18 usually of plastic or of plastic impregnated material, such as the product known commercially as formica. The front of the counter usually is provided with doors providing access to cooking utensils stored therein when not in use. The top 17 is provided with a suitably located circular opening 19 through which extends a cylindrical well member 20, conveniently formed of sheet metal. Well member 20 is provided at its upper edge with an outwardly extending circumferential flange 21 seating on the upper face of countertop 17 and supporting well member 20 therefrom, the latter extending downwardly through opening 19 into the counter, as shown. A finishing rim 22 of greater width than flange 21 seats on the upper face thereof and is secured thereto, conveniently by spot welding, the outer edge of rim 22 seating on covering 18 and the inner portion of rim 22 extending inwardly a short distance beyond flange 21. Preferably, though not necessarily, well member 20 is secured to top 17 by screws, one of which is shown at 23. Within the broader concept of our invention the well member 20 may be supported from the top 17 in any suitable manner.

A supporting tray or pan 25 is mounted for turning movement in the upper portion of well member 20. The pan 25 comprises a cylindrical body 26 closed at one end by a disc 27 of greater diameter than body 26 and provided with a short circumferential flange for retaining a disc 28 formed of the same material as the covering 18 to match therewith. The finishing rim 29 is mounted in the other side of body 26 and is formed to provide an interior shoulder 30 upon which seats the rim 31 of a bowl 32, rim 31 fitting tightly within rim 29 and the latter having a tight fit in body 26 to which it is suitably secured by means of a snap fastener or other quick removal device whereby the bowl 32 may be readily removed when desired for cleaning purposes. The pan member 20 is pressed inwardly at one side and a short distance from the top thereof, to provide an annular seat 33 on the outer face of which seats an annular flange 34 of a shouldered bushing 35 extending through the wall of well member 20 and secured thereto in a suitable manner, conveniently by self-tapping screws 36. The body 26 of pan 25 is also pressed inwardly to provide a seat element 37 coaxial with the seal member or element 33 and receiving, at its inner face, the circumferential flange 38 of a bushing 39 fitting snugly about the reduced inner portion of bushing 35. A sleeve 40 fits snugly through bushing 35 and is provided at its inner end with a circumferential flange 41 seating on the inner face of flange 38 of bushing 39. Sleeve 40 projects outwardly beyond flange 34 of bushing 35 and is provided with a circumferential groove which receives a retaining C ring 42 seating on the outer face of flange 34 of bushing 35. As will be understood, the sleeve 40 in conjunction with the bushings 35 and 39, provides a pivotal mounting for pan 25 at one side of the well member 20.

A strap member 44 of elongated U shape in plan is secured, conveniently by spot welding, to body 26 of pan 25 and is disposed at the side portion of the well member 20 opposite to the sleeve 40 and associated members. The strap member 44 is provided at its midlength with a slot which snugly receives the flattened inner end portion 45 of an operating shaft 46 mounted for turning movement through a short flanged bushing 43 fitting snugly through an opening in the wall of pan member 20 and in a U shaped bracket 47 bolted to well member 20. Bracket 47 has secured thereto, conveniently by welding, a sleeve 48 through which shaft 46 extends, providing a bearing therefor. The shaft 46 is disposed coaxially with sleeve 40 and, in conjunction therewith, provides means mounting the pan 25 for turning movement about an axis extending diametrically thereof. The sleeve 48 is provided with a U shaped slot 49, the arms of which terminate a short distance from the outer end of sleeve 48, this slot receiving a pin 50 fixed in shaft 46 and limiting turning movement thereof in either direction to approximately 180°.

A hollow spool 52 is fixed on shaft 46 and normally is held in its outer position, in contact with the bracket 47, by a compression spring 53 confined between the head of spool 52 and the base flange of bushing 43 seating on the outer face of the well member 20. Spool 52 is provided, at its inner end portion, with two circumferential collars 54 and 55 receiving between them arcuate elements 56 at the inner ends of arcuate latch arms 57 pivoted at opposite sides of shaft 46 between upper and lower angle brackets 58 suitably secured, conveniently by spot welding, to the well member 20. Each of the latch arms is provided at its outer end with a latch finger 59 extending inwardly of well member 20 through a slot 60 therein and guided between upper and lower angle brackets 61 spot welded or otherwise suitably secured to well member 20. The strap member 44 is provided, adjacent each end thereof, with a lengthwise slot 62 which, when pan 25 is in its normal vertical position, is aligned with slot 60 and receives the inner portion of finger 59 for locking pan 25 in position. In the normal vertical position of pan 25, elements 55 of arms 57 are held outward by collar 55 of spool 52 thereby holding the fingers 59 in their inwardly projected locking positions. A hand grip or knob 63 is secured on the outer end of shaft 46. By pressing shaft 46 inward to the extent permitted by pin 50, the pin 50 is disposed to enter the bight portion of slot 49 and collar 54 of spool 52 contacts elements 56 of latch arms 57 thereby retracting the fingers 59 from slots 62 and releasing the pan 25 which may then be turned about its pivot axis through approximately 180°. Assuming the pan 25 to be in its position shown in Figure 3, it may be turned from that position to its position shown in Figure 4, in which the disc 28 of covering material is disposed uppermost and flush with the upper surface of the covering 18 of the countertop 17. Disc 28 then provides a working area adjacent to the upper face of covering 18 and supplementing the working space of the countertop. As will be understood from what has been said, turning of the pan 25 is limited by pin 50 in conjunction with sleeve 48 and, after reversal of the pan has been completed, pressure on knob 63 is released. Spool 52 is then returned to its normal outer position by the compression spring 53 and the fingers 59 of arms 57 are projected inwardly into the slots 62, thereby locking the pan 25 in position as before.

A multi-armed supporting member or spider 65 is mounted in the rim 29 and normally seats on the rim or flange 31 of bowl 32. One arm of spider 65 extends through a slot in rim 29 and receives a pin 66, such as a cotter pin, and the opposite arm of spider 65 normally engages in a slot 67 in rim 29, being held therein by a compression spring 68 confined between a shoulder or abutment adjacent the outer end of the first mentioned arm and the rim 29 at a point adjacent slot 69 through which the outer end of that arm extends, compression spring 68 being mounted about the outer end portion of the last mentioned arm. By moving the spider toward shaft 46, in opposition to compression spring 68, the spider may be released so as to be swung upward clear of the bowl 32, giving ready access thereto for its removal for cleaning purposes. A surface heating unit 70 of known type, comprising a resistor and a sheathing therefor, is suitably mounted on the spider 65. The ends of the resistor of unit 70 are suitably connected to a terminal block 71 which normally extends through openings in the bowl 32 and in body 26 of pan 25. A suitably insulated electrical cord 72 extends through sleeve 40 into pan 25 and between bowl 32 and disc 27, this cord carrying two conductors 73, also suitably insulated, which are connected to the terminal block 71 whereby the resistor of the surface heating unit may be connected into a suitable electric circuit, under control of an appropriately located switch (not shown). With the pan 25 in its position shown in Figures 2 and 3, the surface heating unit 70 is disposed uppermost in position for use in the usual manner. When the surface heating unit 70 is not in use, it may be disposed within the counter by turning the pan 25 through 180° thus disposing the disc 28 of covering material uppermost, the upper face of disc 28 being then in the plane of the upper face of covering 18 and the perimeter of disc 27 being then in close proximity to the inner edge of the finishing rim 22 so that disc 28 provides a working surface substantially continuous with the working surface of the top of the counter except for the rim 22 which is of slight height and presents but little obstruction to the working surface. In that connection, it will be noted that the outer diameter of rim 29 and the diameter of disc 27 are nearly the same as the inner diameter of rim 22, but slight clearance being required to permit of turning the pan 25 from either of its positions to the other thereof.

If the pan 25 be turned to position with the surface heating unit 70 disposed lowermost within the counter when that unit is at a high temperature, there would be risk that the heat rising from that unit would cause buckling and discoloration of or other injury to the disc 28. To guard against that, we provide means whereby turning of the pan 25 to position the surface heating unit within the counter is prevented until that unit has cooled to a sufficiently low temperature to assure that no damage to the disc 28 will occur. To that end we provide a bimetallic strip 75 secured at one end to the well member 20 at the inner face thereof and adjacent the strap member 44. Normally the strip 75 is straight lengthwise and is positioned outwardly from strap 44, as shown in full lines in Figure 2. When the surface heating unit 70 is in use and at a high temperature, heat from that unit is transmitted to the bimetallic strip 75 which then bows inward into its broken line position indicated in Figure 2, being then disposed beneath and in close proximity to the strap member 44. In that position the strip 75 provides an abutment which, in co-operation with strap member 44, effectively prevents turning of the pan 25 in a direction to dispose unit 70 within the counter. After the switch controlling unit 70 has been opened, that unit cools and when it reaches a predetermined temperature the bimetallic strip 75 moves outwardly toward its normal position sufficiently to clear the strap member 44, after which the pan 25 may be turned to position unit 70 within the counter, the temperature of that unit being then sufficiently low to guard against heat injury to the disc 27. It is desirable to provide means to prevent accidental energization of the heating element while the unit 70 is within the counter. A suitable switch, such as a mercury switch (not shown) may be provided to accomplish this function, or the electrical connections may be constructed in accordance with the teachings described hereinafter in connection with a modified form of the invention.

In the modified form of our invention shown in Figures 5 to 11, inclusive, a well member 77, of rectangular shape in plan, is provided at its upper edge with an outwardly extending peripheral flange 78 which seats upon covering 18 of the countertop 17. A finishing rim 79, of greater width than flange 78, seats on the latter and extends a short distance outwardly and inwardly therebeyond. Securing brackets 80 and 81 are fastened to the underface of rim 79, conveniently by spot welding, and extend downward along the inner face of well member 77 to which they are secured by suitable means, brackets 80 being secured by screws 82 passing through the end walls of well member 77 and screwing into the countertop 17, and brackets 81 being secured by self-tapping screws 83 passing through the side walls of the well member 77 and threading through brackets 81. The supporting tray or pan 84, also rectangular in plan and dimensioned to pass through the opening defined by rim 79 with but slight clearance, is mounted in the upper portion of well member 77. The pan includes two closure walls 85 and 86 and the side and end walls of the pan adjacent closure wall 86 are outwardly offset and extended beyond wall 86 to provide a rim 87 in which is positioned a rectangular sheet 88 of the same material as covering 18, seating on and secured to wall 86. At its forward end pan 84 has its front wall 89 pressed outwardly for a portion of the width thereof to provide an outwardly extending boss 90. A short sleeve 91 is mounted on a bolt 92 extending through front wall 93 of pan memer 77 and passing through front wall 89 of pan 84, bolt 92 being restrained against endwise movement by nuts 95 threaded on the inner end thereof the outer one of which abuts a washer 96 abutting the inner end of sleeve 91 the outer end of which is disposed in close proximity to wall 93. The other end wall 97 of pan 77 is provided with an inwardly pressed cylindrical boss 97a. Boss 97a receives the cylindrical head 98 of a porcelain terminal block 99 having a reduced cylindrical neck 100 extending inwardly through an opening in the inner end wall 101 of pan 84. A protective metal sheath 102 fits snugly about neck 100 for a portion of the length thereof and extends outwardly along the base portion of block 99 and the inner face of head 98 thereof, head 98 being secured to boss 97a by self-tapping screws 103 passing through head 98 and sheath 102 and threading through the metal of boss 97a. Neck 100 of terminal block 99 is disposed coaxially with sleeve 91 and provides, in cooperation therewith, means mounting the pan 84 pivotally for turning movement about a central lengthwise axis.

The block 99 is provided with two brass terminal strips 105 and 106 provided at their outer ends with binding screws 107 and 108 for attachment of electrical conductors 174 and 175, as is known. The neck 100 is of stepped formation and the terminal strip 105 extends the major portion of the length of neck 100 and is provided at its inner end with an angularly disposed finger 109 carrying a rounded contact button 110 directed radially outward of neck 100. The contact strip 106 is considerably shorter than strip 105 and is provided at its inner end with an angularly disposed finger 111 carrying a rounded contact button 112 directed radially outward of neck 100. An angle bracket 113 is secured to wall 85 of pan 84, at the inner face thereof and extends to end wall 101, being provided at its rearward end with a reduced element passing through a slot in that wall. A block 114 of insulating material is secured to bracket 113 and carries two binding or terminal posts 115 and 116 secured thereto and mounted on the free face thereof at opposite sides of neck 100 of the terminal block 99. Terminal post 115 carries a button 117 and is provided with a binding screw 118 for attachment of one end of a suitably insulated conductor 119. The terminal post 116 is also provided with a contact button 120 and a binding screw 121 for attachment of a suitably insulated conductor 122. The binding posts 115, 116 are so disposed that in the position of the pan 84 shown in Figures 6 and 7 the buttons 110 and 117 are in contact and the buttons 112 and 120 also are in contact, for establishing electrical connections between conductor 119 and strip 105 and conductor 122 and strip 106. The terminal block 99 is formed in two sections, as is known, for reception of the terminal strips 105 and 106.

A stub shaft 124 is mounted for turning movement in a flanged thimble 125 seating in a boss 126 pressed inwardly from the front wall 93 of pan 77 and extends inwardly through wall 93. An operating shaft 127, suitably recessed from its inner end, fits over the thimble 125, seating on the flange thereof, and receives stub shaft 124, shaft 127 having two interior grooves which receive the end portions of a pin 128 extending through stub shaft 124 diametrically thereof. Shaft 127 extends through an opening 129 in front wall 16 of counter 15 and is of reduced diameter at its outer end portion. A compression spring 130 is mounted about the outer end portion of shaft 127 and is confined between the body portion thereof and an annular plate 131 secured to front wall 16, spring 130 holding the inner end of shaft 127 seated on the base flange of the thimble 125. A suitable hand grip or knob 132 is secured upon the outer end of shaft 127 for turning the latter in either direction and thereby turning the stub shaft 124. As shown, operating shaft 127 is coaxial with stub shaft 124, the two being disposed below sleeve 91 and in vertical alignment therewith, though they may be disposed in any suitable position.

A latch bar 134 is slidably mounted on pan 84 at the front thereof, this bar being disposed horizontally and positioned, for a substantial portion of its length, at the outer face of boss 90. The sleeve 91 extends through a lengthwise slot 136 in bar 134 to assist in guiding the latter in its movements. Bar 134 is bent rearward to extend through an opening 137 in front wall 89 of pan 84 and is then bent forward to extend through a slot in side wall 138 of pan 84, the outer end portion of bar 134 being formed to provide a locking finger 139 disposed to engage through a slot 140 in side wall 141 of well member 77, when the pan 84 is in its position shown in Figures 5 to 8, inclusive, and the latch bar 134 is in projected or locking position. The other side wall 142 of the well member 77 is also provided with a slot 143 disposed to receive finger 139 of latch bar 134 when the pan 84 is in its position shown in Figure 9. The latch bar 134 fits snugly through side wall 138 of pan 84 so as to be guided thereby in cooperation with sleeve 91. A leaf spring 144 is fixedly secured at its rearward end to side wall 138 of pan 84 and is provided at its forward end with a finger 145 of reduced width extending through an opening in latch bar 134 adjacent finger 139 thereof. Spring 144 urges latch bar 134 outward toward its projected or locking position.

Latch bar 134 is provided at its inner end with a head 148 extending above and below the bar and provided at each end with a forwardly extending cam finger 149. An operating member 150 is secured on the inner end of stub shaft 124 for turning movement therewith. As is shown more clearly in Figure 8, the member 150 comprises a lower cam element 151, fixed on stub shaft 124, and two upwardly diverging arms 152 and 153 fixed to, conveniently integral with, cam element 151. The operating member 150 is disposed in close proximity to the outer face of latch bar 134 and when the tray or pan 84 is in its operative position shown in Figures 6, 7 and 8, arm 153 is disposed at the left side of and closely adjacent sleeve 91 effective for restraining turning of the operating member 150 clockwise. In order to invert the pan 84 knob 132 is turned counterclockwise, thereby turning the operating member 150 in the same direction. During the first portion of the counterclockwise turning movement of member 150 cam element 151 thereof, then in contact with the then lower finger 149 of head 148, forces the latch bar 134 toward the right, as viewed in Figure 8, thereby retracting finger 139 from slot 140 and releasing pan 84 from the well member 77. Thereafter, in the continued turning movement of pan 84 counterclockwise finger 139 of latch bar 134 is moved downward so as to extend below slot 140, after which the lower cam finger 149 of head 148 is moved away from cam element 151, due to the eccentricity of stub shaft 124 relative to sleeve 91, thereby releasing the latch bar 134 which is then held in contact with wall 141 by the leaf spring 144. In the continued turning of the operating member 150 arm 153 thereof contacts a stud 154 fixed to boss 90 and projecting through a slot 155 in the latch bar 134. Thereafter continued turning of member 150 imparts positive turning movement counterclockwise to the pan 84 until it has been turned through an arc of 180°, at which time finger 139 of latch bar 134 is aligned with slot 143 in wall 142 of well member 77 and the latch bar 134 is then projected by spring 144 so as to cause the finger 139 to enter slot 143 thereby locking the pan 84 in its inverted or reversed position shown in Figure 9. In that connection, during the first part of the counterclockwise turning movement of pan 84, the latch bar 134 passes out of contact with wall 141 and is moved to its fully projected position by the spring 144, and in the latter part of the counterclockwise turning movement of pan 84 finger 139 of latch bar 134 contacts wall 142 of the well member 77 so as to cause the inward movement of latch bar 134 in opposition to spring 144, placing the latter under tension effective for projecting bar 134 upon completion of the turning movement of the pan 84, as above described.

Figure 1:
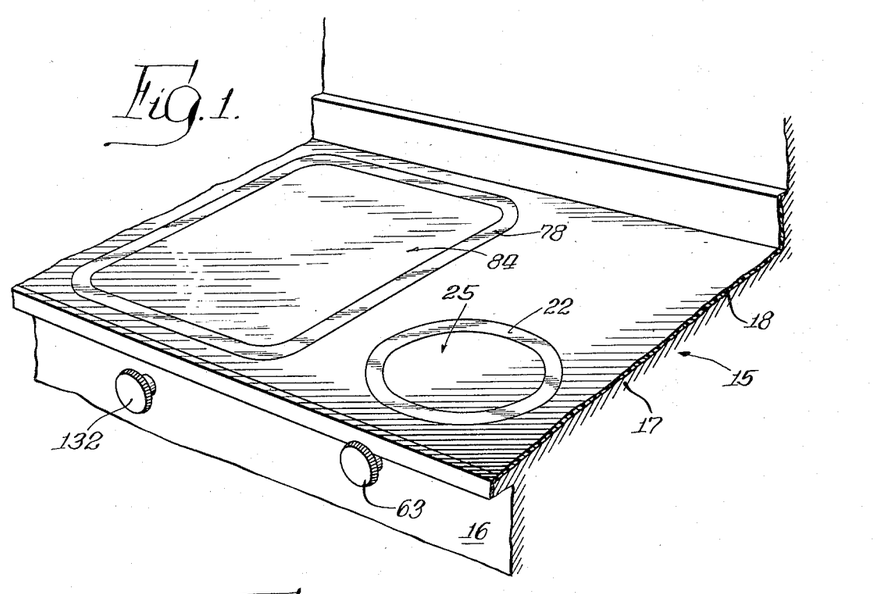
Figure 1 is a fragmentary perspective view of a kitchen counter and cooking appliances mounted thereon in accordance with our invention and disposed in their normal concealed positions within the counter.
Figure 2:
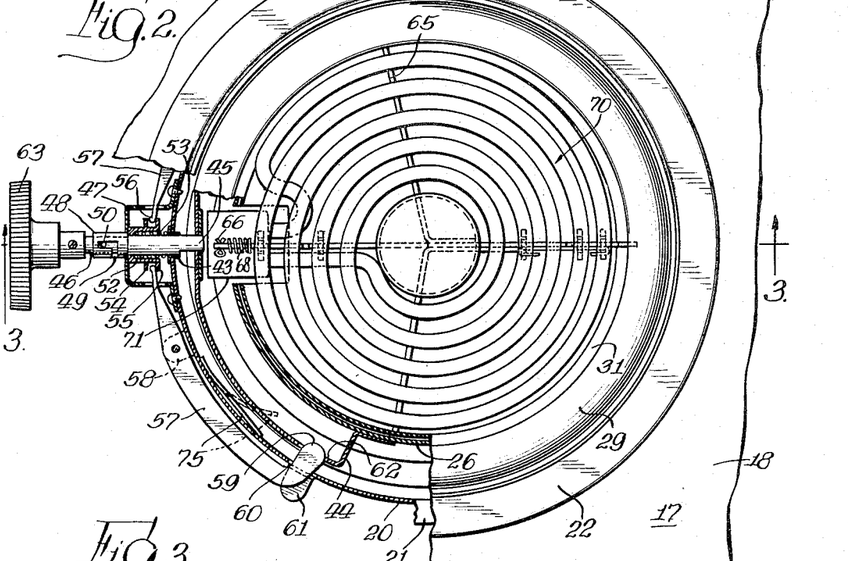
Figure 2 is a top plan view of a heating surface unit assembly embodying our invention, partly broken away with certain parts shown in section, on an enlarged scale relative to Figure 1.
Figure 3:
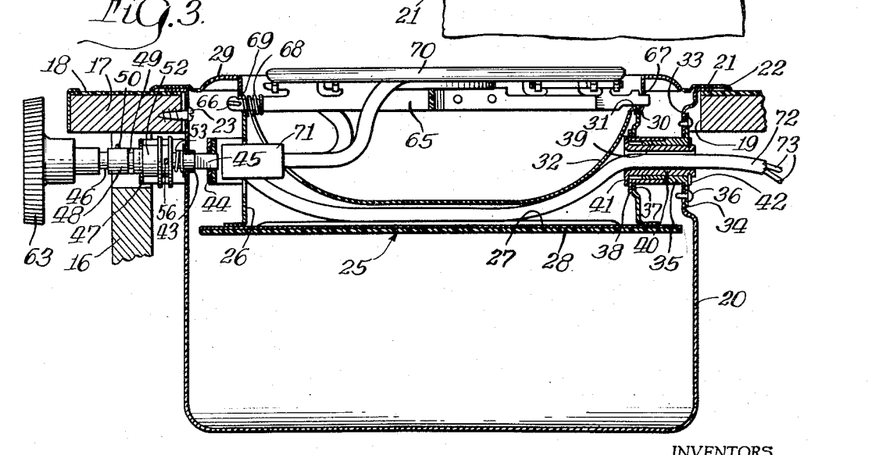
Figure 3 is a sectional view taken substantially on line 3—3 of Figure 2 showing also adjacent portions of the counter in section, certain parts being shown in elevation.
Figure 4:
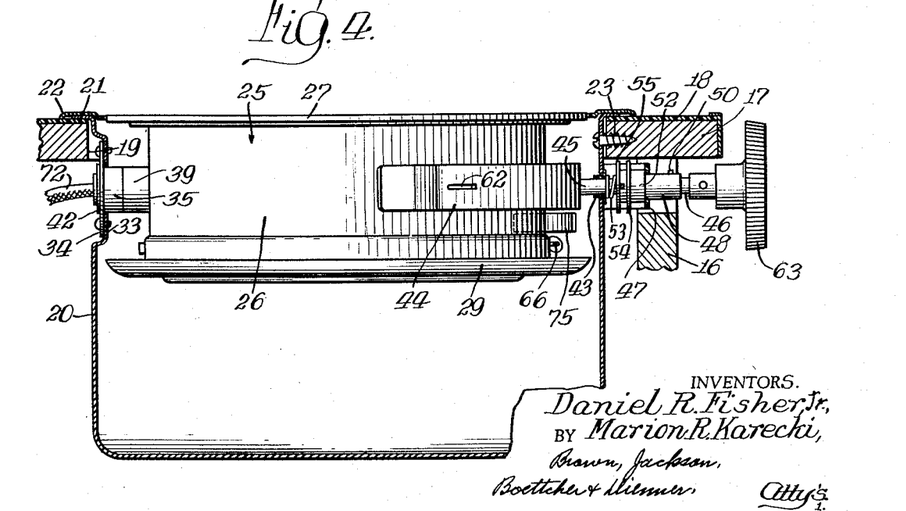
Figure 4 is a veiw similar to Figure 3 but looking in the opposite direction and with the heating surface unit inverted and positioned within the associated well member of the assembly.
Figures 5, 10, 11:
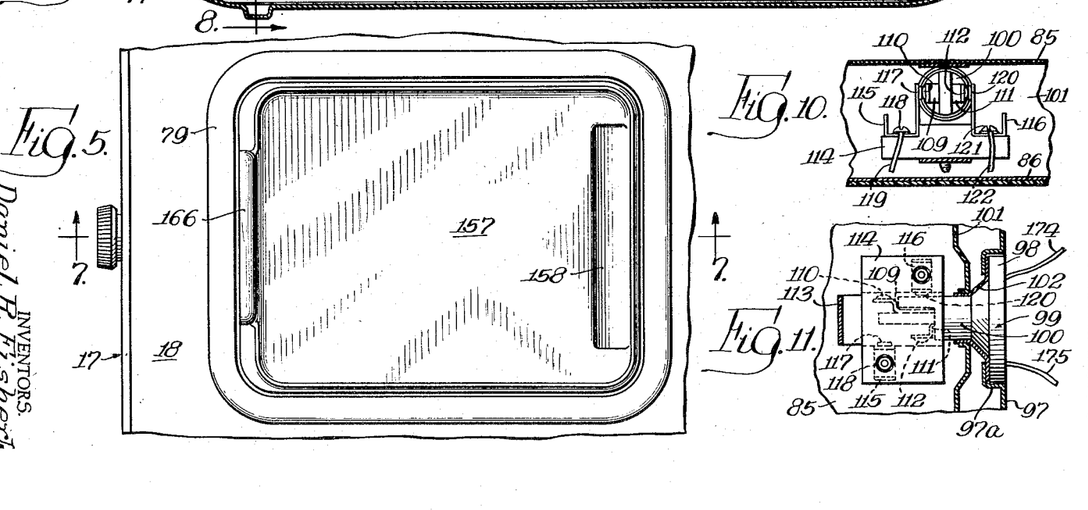
Figure 5 is a plan view similar to Figure 2 but illustrating a modified form of our invention in which the cooking appliance is a griddle.
Figure 10 is fragmentary sectional view taken substantially on line 10—10 of Figure 6.
Figure 11 is a plan view of the rear terminal block and bracket and associated parts in the positions which they occupy when the pan is in its position shown in Figure 9.
Figure 6:
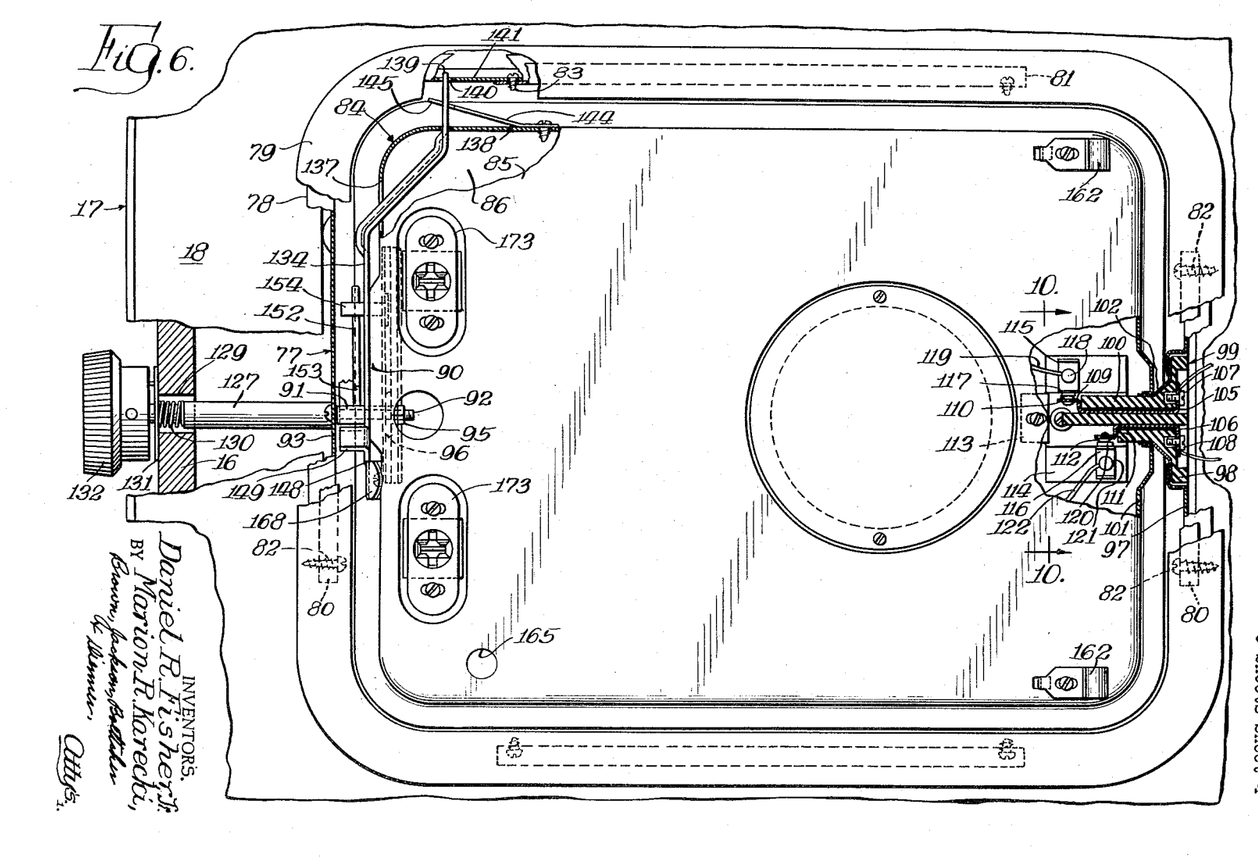
Figure 6 is a view similar to Figure 5 but with the griddle removed and certain parts broken away and shown in section, on an enlarged scale.
Figure 7:
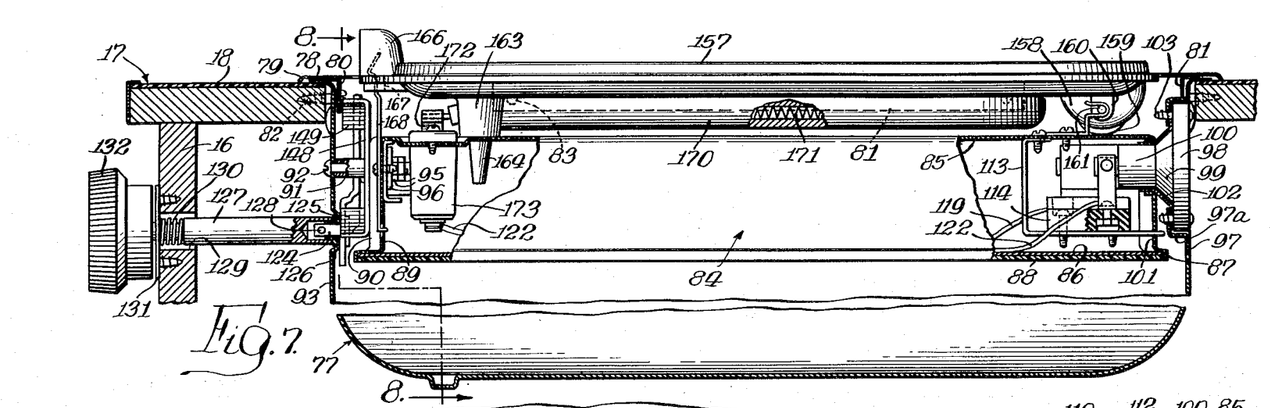
Figure 7 is a sectional view taken substantially on line 7—7 of Figure 5 but with the griddle and the supporting pan therefor shown in elevation and partly broken away, certain other parts being shown in elevation and partly broken away and shown in section, on an enlarged scale.
Figure 8:
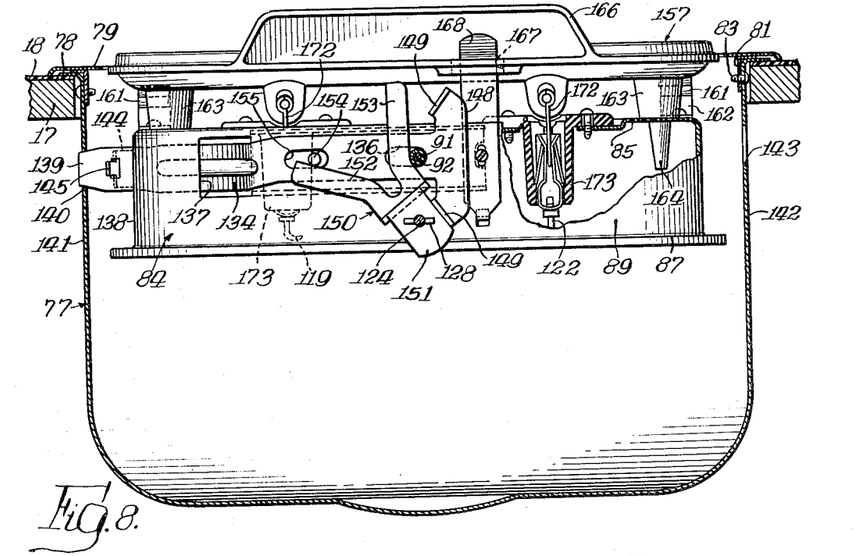
Figure 8 is a sectional view taken substantially on line 8—8 of Figure 7, certain parts being shown in elevation.
Figure 9:
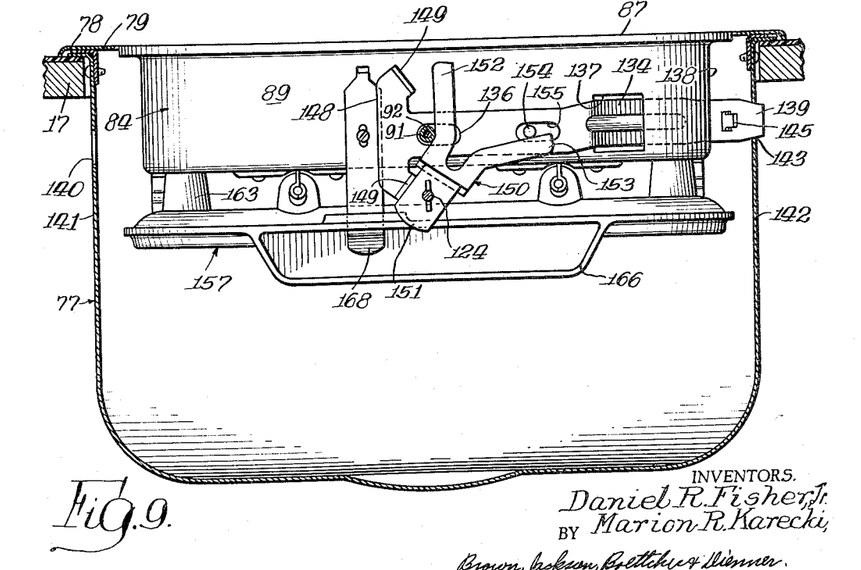
Figure 9 is a view similar to Figure 8 but with the griddle unit inverted and the griddle disposed within the well member of the assembly.

Turning of the pan 84 to its position shown in Figure 9 disposes the latch bar 134 and the operating member 150 in the positions shown in the latter figure, with arm 152 of member 150 disposed to the right of and adjacent sleeve 91 so as to be restrained thereby against counterclockwise turning movement. In order to turn the pan 84 from its position shown in Figure 9 to its position shown in Figure 8, the operating member 150 is turned in clockwise direction, the operation being the same as above described except that the arm 152 of member 150 now contacts stud 154 and imparts clockwise turning movement to pan 84. As will be understood from the above, turning movement of pan 84 through more than 180° is positively prevented by sleeve 91 in cooperation with the operating member 150 and the pan 84 is positively locked in each of its operative positions. When the pan 84 is in its position shown in Figure 9, the upper face of the sheet 88 of material carried by pan 84 is disposed substantially in the plane of the upper face of covering 18 of the countertop 17 providing additional or supplementary working area for the countertop. In that connection, the dimensions of the pan 84 are such that it will pass freely through the opening defined by the finish rim 79, when the wall 86 of the pan is disposed uppermost, the required clearance being held to a minimum. Wall 85 of pan 84 is adapted for reception of a cooking appliance such as a griddle 157. The griddle 157 is preferably formed of aluminum and is of rectangular shape in plan and is provided at its rearward portion with a transverse grease receiving trough 158. The trough 158 is provided adjacent each end thereof with a downward extension 159 disposed to seat on wall 85 and griddle 157 is also provided, adjacent each end of trough 158, with a downwardly extending boss 160 in which is secured a pin 161 disposed for engagement with a forwardly opening spring clip 162 secured to wall 85 adjacent the rear thereof. The griddle 157 is further provided, a short distance from the front and adjacent each side thereof, with a downwardly extending boss 163 from which a downwardly tapering positioning pin 164 extends for insertion through a circular opening 165 in wall 85. Griddle 157 is provided at the midportion of its front with a forwardly extending hood 166 having in its bottom wall a slot 167 through which extends a spring latch 168 mounted on end wall 89 of pan 84 at the outer face thereof. Latch 168 normally engages over the bottom wall of hood 166 and holds the forward end of griddle 157 in operative position on wall 85 with bosses 163 seating on that wall. The griddle may readily be removed by pressing the latch 168 rearward and raising the front portion of griddle 157 and then pulling it forward so as to disengage the pins 161 from the clips 162, and may as readily be replaced by reversing that operation. When the griddle is not required for use, the pan 84 may be turned from its position shown in Figures 6, 7 and 8 through 180° to its position shown in Figure 9, so as to dispose the griddle within the counter, as previously described. After use the griddle normally is removed and the grease drained from the trough 158, after which the griddle is cleaned and may be replaced so as to be available for use when required. There is little likelihood that the griddle will be at an objectionably high temperature after it has been cleaned and replaced on the pan 84 and, for that reason, it is not necessary to provide thermo-responsive means for preventing turning of pan 84 into position to dispose the griddle within the counter.

The griddle 157 is provided at its underface with a rib 170 of elongated U shape in plan in which is housed a heating element or resistor 171 disposed within a suitable covering or sheath. A contact blade 172 is secured to each end of the resistor 171 and is disposed to enter a porcelain connector block 173 secured to wall 85 and extending downward through an opening thereof into pan 84. Lead conductor 119 is connected to one of the connector blocks 173, which may be of any suitable known type, and the lead conductor 122 is connected to the other block 173. Lead in conductors 174 and 175 are connected to the connector strips 105 and 106, respectively, and are also connected to a suitable source of supply of electricity, under control of a suitable switch (not shown). The switch controlling the conductors 174 and 175 may normally remain closed. When the griddle 157 is in its operative position on the pan 84, with the latter in position exposing griddle 157 for use, the circuit of the griddle heating element 171 is completed from the lead in conductors 174 and 175 through the contact strips 105 and 106, contact buttons 110 and 117 and post 115 and lead 119 to one of the connector blocks 173, the corresponding switch blade 172, resistor 171, the other switch blade 172 and block 173, lead 122, post 116, contact buttons 120 and 112, and strip 106 to lead in conductor 175. When the pan 84 is turned to position to dispose the griddle 157 within the counter, the pan 84, and with it the bracket 113 and the parts carried thereby, has been turned through 180° from its position shown in Figures 6 and 7. That reverses the positions of the posts 115 and 116 so that the contact buttons 117 and 120, respectively, thereof are spaced away from buttons 110 and 112 of strips 105 and 106, respectively, thus opening the circuit of the heating element or resistor 171 of the griddle. It will be clear, from what has been said, that when the griddle is positioned for use the circuit thereof is closed in the turning of pan 84 to so position the griddle and when the griddle is moved into the counter by turning of pan 84 the circuit of the heating element of the griddle is opened. The connector block 114 and associated parts thus provide switch means for automatically closing and opening the circuit of the heating element of the griddle when it is moved to and from its exposed position for use. If desired, the griddle 157 may be replaced by any suitable cooking appliance, as will be understood.

It will be clear from the above that in both forms of our invention, shown by way of example, the pan can not be turned more than 180° in either direction. That is of importance in that it effectively prevents twisting of the electrical conductors or leads such as might cause breakage or abrasion of the insulation thereof with a resultant short circuit. While we have disclosed but one each of two appliance assemblies, it will be understood that any suitable number of such assemblies of any suitable type may be provided and arranged on the countertop in any suitable manner.

It should be pointed out that the well members 20 and 77 provide a box structure of approved type for enclosing the electrical wiring as is necessary to satisfy the requirements for approval by the Underwriters' Laboratories. The well members also serve to catch spillage from the cooking operations. In order to clean the interior of the well members 20 and 77, the rotatable cooking assemblies may be revolved approximately 90° on their axes thereby to provide an adequate clearance space on either side for insertion of the hand together with any necessary cleaning implements.

While we have illustrated and described out invention by way of reference in combination with a conventional form of kitchen countertop work surface, it is obvious that the functional and utilitarian aspects thereof may be readily adapted to any desired area. For example, units of the type illustrated and described may be readily adapted for use as surface cooking units on a conventional form of free-standing range, or they may be incorporated into a portable stand, serving cart, or the like.

As above indicated, it will be understood that variations may be resorted to without departing from the field and scope of our invention, and we intend to include all such variations, as fall within the scope of the appended claims, in this application in which the preferred forms only of our invention have been diclosed.

We claim:

1. In cooking apparatus of the character described, a structure comprising a top wall having an opening therein, a supporting member pivotally mounted on said wall at said opening thereof for turning movement about a transverse axis and reversible to occupy either one of two operative positions for disposing either side of said member at said opening, one side of said member providing a surface substantially conforming to said opening and disposed to be positioned therein substantially flush with the upper surface of said top wall in one position of said member, a cooking appliance mounted on said member at the opposite side thereof and exposed through said opening for use in the other position of said member, an adjusting member mounted on said structure for turning movement about said axis and for movement along said axis toward and away from said supporting member, said adjusting member being connected to said supporting member for turning the latter to either of its said two positions, and supplementary means cooperating with said adjusting member for releasably locking said supporting member in each of its said two positions.

2. In cooking apparatus of the character described, a structure comprising a top wall having an opening therein, a supporting member pivotally mounted on said wall at said opening thereof for turning about a transverse axis and reversible to occupy either one of two operative positions for disposing either side of said member at said opening, one side of said member providing a surface substantially conforming to said opening and disposed to be positioned therein substantially flush with the upper surface of said wall in one position of said member, a cooking appliance mounted on said member at the opposite side thereof and exposed through said opening for use in the other position of said member, an adjusting member mounted on said structure for turning movement about said axis and for movement along said axis toward and away from said supporting member, said adjusting member being connected to said supporting member for turning the latter to either of its said two positions, normally engaged means for releasably locking said member in each of its said two positions, and means for releasing said locking means by movement of said adjusting member in one direction along said axis.

3. In countertop cooking apparatus, a structure comprising a countertop having an opening therein, a supporting member pivotally mounted on said countertop at said opening thereof for turning movement about a transverse axis and reversible to occupy either one of two operative positions for disposing either side of said member at said opening, one side of said member providing a surface substantially conforming to said opening and disposed to be positioned therein substantially flush with the upper surface of said countertop in one position of said member, a cooking appliance mounted on said member at the opposite side thereof and exposed through said opening for use in the other position of said member, an adjusting member mounted on said structure for turning movement about said axis and for movement along said axis toward and away from said supporting member, said adjusting member being connected to said supporting member for turning the latter to either of its said two positions, locking means normally releasably engaging said member for locking it in each of its said two positions, and means for disengaging said locking means by movement of said adjusting member in one direction along said axis.

4. In countertop cooking apparatus, a structure comprising a countertop having an opening therein, a supporting member mounted on said countertop at said opening thereof for turning movement about an axis extending transversely of said opening and reversible about said axis to occupy either one of two operative positions for disposing either side of said member at said opening, one side of said member providing a surface substantially conforming to said opening and disposed to be positioned therein substantially flush with the upper face of said countertop in one position of said member, a cooking appliance mounted on said member at the opposite side thereof and exposed through said opening for use in the other position of said member, an adjusting member mounted on said structure for turning movement about said axis and for movement along said axis toward and away from said supporting member, said adjusting member being connected to said supporting member for turning the latter to either of its said two positions, normally engaged means for releasably locking said member in each of its said two positions, and means for releasing said locking means by movement of said adjusting member toward said supporting member.

5. In countertop cooking apparatus, a countertop having an opening therein, a supporting member mounted on said countertop at said opening thereof for turning movement in opposite directions through approximately 180° about an axis extending transversely of said opening and reversible about said axis to occupy either one of two operative positions for disposing either side of said member at said opening, one side of said member providing a surface substantially conforming to said opening and disposed to be positioned therein substantially flush with the upper face of said countertop in one position of said member, a cooking appliance mounted on said member at the opposite side thereof and exposed through said opening for use in the other position of said member, means for releasably locking said member in each of its said two positions and for releasing it and turning it to either of said positions selectively, said last mentioned means including means restraining said member against turning movement in either direction in excess of approximately 180°, and means effective for preventing heating of said cooking appliance when said supporting member is in its said one position.

6. In countertop cooking apparatus, a countertop having an opening therein, a supporting member mounted on said countertop at said opening thereof for turning movement in opposite directions through approximately 180° about an axis extending transversely of said opening and reversible about said axis to occupy either one of two operative positions for disposing either side of said member at said opening, one side of said member providing a surface substantially conforming to said opening and disposed to be positioned therein substantially flush with the upper face of said countertop in one position of said member, an electric cooking appliance mounted on said member at the opposite side thereof and exposed through said opening for use in the other position of said member, means for releasably locking said member in each of its said two positions, means for releasing said member and turning it to either of its said two positions, said last mentioned means including means restraining said member against turning in either direction in excess of approximately 180°, and means effective for preventing heating of said cooking appliance when said supporting member is in its said one position.

7. In countertop cooking apparatus, a countertop having an opening therein, a well member secured to said countertop about said opening and extending downward therefrom, a supporting pan pivotally mounted in said well member for turning movement about an axis extending transversely of said opening, said pan being movable through said opening and turnable in opposite directions through approximately 180° to either one of two operative positions selectively, one side of said pan providing a surface substantially conforming to said opening and disposed to be positioned therein substantially flush with the upper face of said countertop in one position of said pan, an electric cooking appliance mounted on said pan at the opposite side thereof and exposed through said opening for use in the other position of said pan, means for releasably locking said pan in each of said two positions, means for releasing said pan and turning it to either of said two positions, and means effective for preventing heating of said appliance when said supporting member is in its said one position.

8. In countertop cooking apparatus, a countertop having an opening therein, a supporting member mounted on said countertop at said opening thereof for turning movement about an axis extending transversely of said opening and reversible about said axis to occupy either one of two operative positions for disposing either side of said member at said opening, one side of said member providing a surface substantially conforming to said opening and disposed to be positioned therein substantially flush with the upper face of said countertop in one position of said member, a cooking appliance mounted on said member at the opposite side thereof and exposed through said opening for use in the other position of said member, means for releasably locking said member in each of its said two positions, means for releasing said member and turning it to either of its said two positions, and normally ineffective supplementary locking means effective for restraining said member against movement from its said other position to its said one position when said cooking appliance is at a temperature above a predetermined value and ineffective when the temperature of said appliance is at or below such value.

9. In countertop cooking apparatus, a countertop having an opening therein, a supporting member mounted on said countertop at said opening thereof for turning movement about an axis extending transversely of said opening and reversible about said axis to occupy either one of two operative positions for disposing either side of said member at said opening, one side of said member providing a surface substantially conforming to said opening and disposed to be positioned therein substantially flush with the upper face of said countertop in one position of said member, a cooking appliance mounted on said member at the opposite side thereof and exposed through said opening for use in the other position of said member, means for releasably locking said member in each of its said two positions, means for releasing said member and turning it to either of its said two positions, and normally ineffective thermo-responsive means subject to heat generated by said appliance effective for restraining said member against movement from its said other position to its said one position when said cooking appliance is at a temperature above a predetermined value and ineffective when the temperature of said appliance is at or below such value.

10. In countertop cooking apparatus, a countertop having an opening therein, a well member secured to said countertop about said opening and extending downward therefrom, a supporting pan pivotally mounted in said well member for turning movement about an axis extending transversely of said opening, said pan being movable through said opening and turnable in opposite directions through approximately 180° to either one of two operative positions selectively, one side of said pan providing a surface substantially conforming to said opening and disposed to be positioned therein substantially flush with the upper face of said countertop in one position of said pan, an electric cooking appliance mounted on said pan at the opposite side thereof and exposed through said opening for use in the other position of said pan, means for releasably locking said pan in each of said two positions, means for releasing said pan and turning it to either of said two positions, and means restraining said pan against movement from its said other position when the temperature of said appliance is above a predetermined value, said means comprising two stop members, one an abutment member and the other a bimetallic member subject to heat generated by said appliance, one of said stop members being on said pan and the other on said well member, said bimetallic stop member normally being disposed to clear said other stop member and being moved into the path of the latter when the temperature of said appliance exceeds said predetermined value.

11. In countertop cooking apparatus, a countertop having an opening therein, a well member secured to said countertop about said opening and extending downward therefrom, a supporting pan pivotally mounted in said well member for turning movement about an axis extending transversely of said opening, said pan being movable through said opening and turnable in opposite directions through approximately 180° to either one of two operative positions selectively, one side of said pan providing a surface substantially conforming to said opening and disposed to be positioned therein substantially flush with the upper face of said countertop in one position of said pan, an electric cooking appliance mounted on said pan at the opposite side thereof and exposed through said opening for use in the other position of said pan, means for releasably locking said pan in each of said two positions, means for releasing said pan and turning it to either of said two positions, a bracket fixed to said pan, and a bimetallic stop secured to said well member normally disposed to clear said bracket and movable to cooperative relation thereto effective for restraining said pan against movement from its said other position when the temperature of said appliance is above a predetermined value.

12. In countertop cooking apparatus, a countertop having an opening therein, a well member secured to said countertop about said opening and extending downward therefrom, a supporting pan pivotally mounted in said well member for turning movement about an axis extending transversely of said opening, said pan being movable through said opening and turnable in opposite directions through approximately 180° to either one of two operative positions selectively, one side of said pan providing a surface substantially conforming to said opening and disposed to be positioned therein substantially flush with the upper face of said countertop in one position of said pan, an electric cooking appliance removably mounted on said pan at the opposite side thereof and exposed through said opening for use in the other position of said pan, means for releasably locking said pan in each of said two positions, means for opening and closing the circuit of said appliance incident to removal and replacement thereof respectively, and means for releasing said pan and turning it to either of said two positions.

13. In countertop cooking apparatus, a countertop having an opening therein, a well member secured to said countertop about said opening and extending downward therefrom, a supporting pan pivotally mounted in said well member for turning movement about an axis extending transversely of said opening, said pan being movable through said opening and turnable in opposite directions through approximately 180° to either one of two operative positions selectively, one side of said pan providing a surface substantially conforming to said opening and disposed to be positioned therein substantially flush with the upper face of said countertop in one position of said pan, an electric cooking appliance removably mounted on said pan at the opposite side thereof and exposed through said opening for use in the other position of said pan, means for releasably locking said pan in each of said two positions, means for opening and closing the circuit of said appliance incident to turning of said pan to its said one position and its said other position respectively, and means for releasing said pan and turning it to either of said two positions.

14. In countertop cooking apparatus, a countertop having an opening therein, a well member secured to said countertop about said opening and extending downward therefrom, a supporting pan pivotally mounted in said well member for turning movement about an axis extending transversely of said opening, said pan being movable through said opening and turnable in opposite directions through approximately 180° to either one of two operative positions selectively, one side of said pan providing a surface substantially conforming to said opening and disposed to be positioned therein substantially flush with the upper face of said countertop in one position of said pan, an electric cooking appliance removably mounted on said pan at the opposite side thereof and exposed through said opening for use in the other position of said pan, means for releasably locking said pan in each of said two positions, means for opening and closing the circuit of said appliance incident to removal and replacement thereof respectively, means for opening and closing the circuit of said appliance incident to turning of said pan to its said one position and its said other position respectively, and means for releasing said pan and turning it to either of said two positions.

15. In countertop cooking apparatus, a counter comprising a countertop having an opening therein, a supporting member mounted on said countertop at said opening and reversible to occupy either one of two operative positions for disposing either side of said member at said opening, one side of said member providing a surface substantially conforming to said opening and disposed to be positioned therein substantially flush with the upper surface of said countertop in one position of said member, a cooking appliance mounted on said member at the opposite side thereof disposed within said counter in said one position of said member and exposed through said opening for use in the other position of said member, means for releasably locking said member in each of its said two positions, and thermoresponsive means subject to heat from said appliance effective for restraining said member against movement from its said other position to its said one position when said cooking appliance is at a temperature above a predetermined value, said thermoresponsive means being ineffective when said appliance is at a temperature below said predetermined value whereby said supporting member normally may be moved to either of its said positions independently of said thermoresponsive means.

References Cited in the file of this patent

UNITED STATES PATENTS

| 2,337,098 | Gomersall | Dec. 21, 1943 |
| 2,417,977 | French | Mar. 25, 1947 |
| 2,722,592 | Pellegrin | Nov. 1, 1955 |
| 2,738,411 | Sandin | Mar. 13, 1956 |

FOREIGN PATENTS

| 878,092 | France | Jan. 11, 1943 |